(12) United States Patent
Ueno (10) Patent No.: US 10,061,120 B2
(45) Date of Patent: Aug. 28, 2018

(54) OPTICAL SCANNER (71) Applicants: KABUSHIKI KAISHA TOSHIBA, Minato-ku, Tokyo (JP); TOSHIBA TEC KABUSHIKI KAISHA, Shinagawa-ku, Tokyo (JP)

(72) Inventor: Sueo Ueno, Mishima Shizuoka (JP)

(73) Assignees: KABUSHIKI KAISHA TOSHIBA, Tokyo (JP); TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 15/728,578

(22) Filed: Oct. 10, 2017

(65) Prior Publication Data
US 2018/0045951 A1    Feb. 15, 2018

Related U.S. Application Data (63) Continuation of application No. 14/810,707, filed on Jul. 28, 2015, now Pat. No. 9,810,903.

(51) Int. Cl.
*G02B 26/10* (2006.01)
*G02B 26/08* (2006.01)
*G03G 15/043* (2006.01)

(52) U.S. Cl.
CPC ....... *G02B 26/105* (2013.01); *G02B 26/0833* (2013.01); *G03G 15/043* (2013.01)

(58) Field of Classification Search
CPC . G02B 26/105; G02B 26/0833; G03G 15/043
USPC ................... 359/214.1, 221.1, 226.1; 355/67
See application file for complete search history.

(56) References Cited

U.S. PATENT DOCUMENTS

| | | |
|---|---|---|
| 6,775,043 B1 | 8/2004 | Leung et al. |
| 8,810,623 B2 | 8/2014 | Mizutani |
| 2009/0225383 A1 | 9/2009 | Soeda et al. |
| 2012/0300197 A1 | 11/2012 | Richter et al. |
| 2014/0333980 A1 | 11/2014 | Hofmann |
| 2015/0092118 A1 | 4/2015 | Hada et al. |
| 2016/0255318 A1 | 9/2016 | Chevallaz et al. |

OTHER PUBLICATIONS

Non-Final Office Action for U.S. Appl. No. 14/810,707 dated Oct. 5, 2016.
Final Office Action for U.S. Appl. No. 14/810,707 dated Apr. 6, 2017.

*Primary Examiner* — Frank Font
(74) *Attorney, Agent, or Firm* — Amin, Turocy & Watson LLP (57) ABSTRACT

An optical scanner comprises a light source and an MEMS mirror. The light source emits a light beam. The MEMS mirror has a reflecting surface for reflecting the light beam coming from the light source. The light source is configured in such a manner that the optical axis of the light beam vertically irradiates the reflecting surface of the MEMS mirror at a specific position.

6 Claims, 6 Drawing Sheets

OPTICAL SCANNER

CROSS-REFERENCE TO RELATED APPLICATIONS

This application is a Continuation of application Ser. No. 14/810,707 filed on Jul. 28, 2015, the entire contents of which are incorporated herein by reference.

FIELD

Embodiments described herein relate to an optical scanner.

BACKGROUND

The optical scanner used in an image forming apparatus to form an electrostatic latent image on a photoconductive drum uses a Micro Electro Mechanical System (MEMS) mirror. Sometimes, the drive position of the MEMS mirror is deviated for the change in temperature or the secular change of the MEMS mirror. Thus, the optical scanner needs to detect the drive position of the MEMS mirror. However, sometimes, to detect the drive position of the MEMS mirror, another optical sensor such as a light beam detection sensor must be provided for laser detection, thus increasing the cost of the optical scanner.

DETAILED DESCRIPTION

In accordance with an embodiment, an optical scanner comprises a light source and an MEMS mirror. The light source emits a light beam. The MEMS mirror has a reflecting surface for reflecting the light beam coming from the light source. The light source is configured in such a manner that the optical axis of the light beam of the light source vertically irradiates the reflecting surface of the MEMS mirror at a specific position.

Embodiment 1

Figure 1:
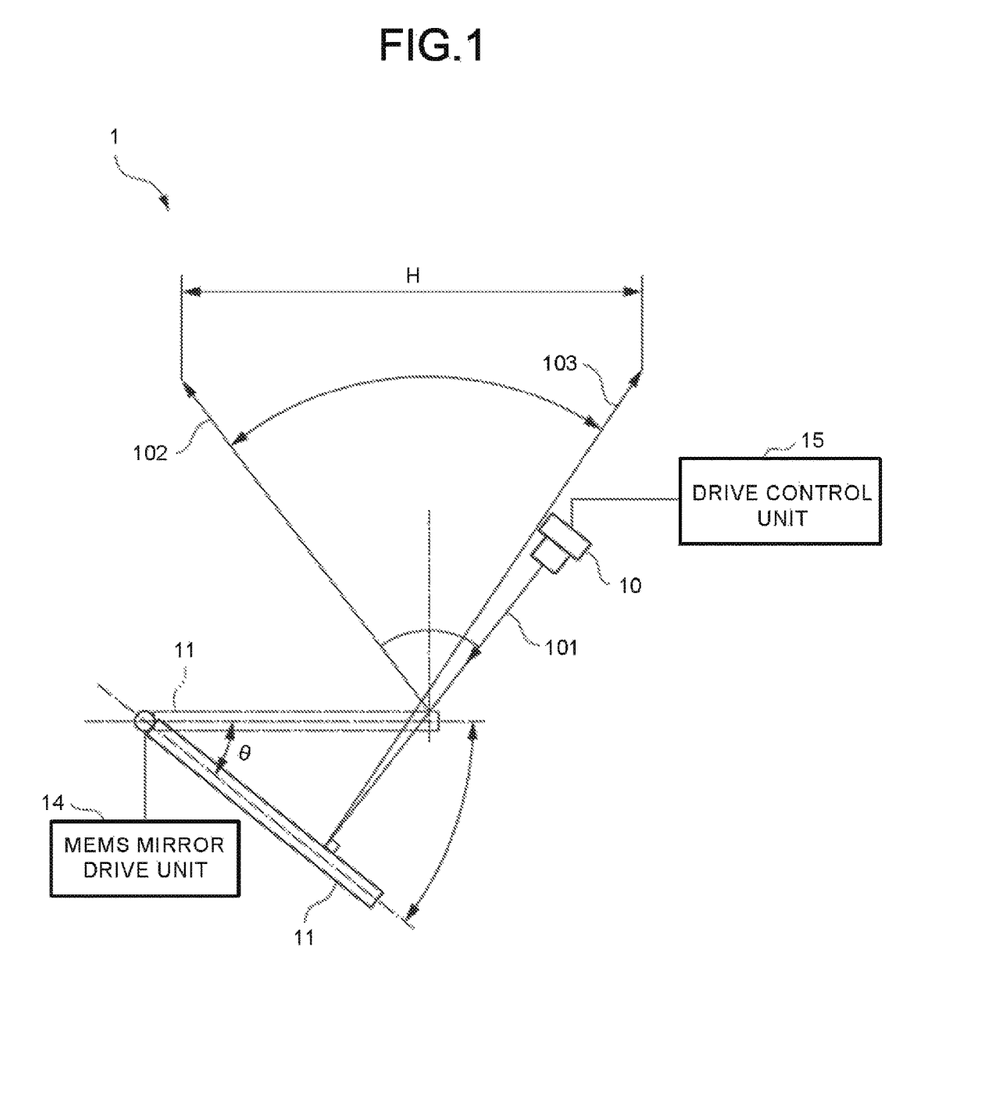
FIG. 1 is a diagram illustrating the appearance of an example of an optical scanner 1 according to embodiment 1.

FIG. 1 is a diagram illustrating the appearance of an example of an optical scanner 1 according to an embodiment. For example, the optical scanner 1 is applied to an image forming apparatus which is, for example, a Multi-Function Peripheral (MFP). The optical scanner 1 emits a light beam which is modulated according to an image signal read by the image forming apparatus. Moreover, the optical scanner 1 reflects the emitted light beam with an MEMS mirror and irradiates (exposes) the surface of a photoconductive drum with the reflected light beam, thereby forming an electrostatic latent image on the surface of the photoconductive drum with the reflected light beam.

The optical scanner 1 comprises a light source 10, an MEMS mirror 11, an MEMS mirror drive unit 14 and a drive control unit 15.

The light source 10 is provided with a light emitting component for emitting a light beam 101. For example, a laser diode is arranged on the light source 10 as the light emitting component. The light beam emitted from the light source 10 is reflected by the MEMS mirror 11 to form an image on a photoconductive drum. The light source 10 is configured in such a manner that the optical axis of the light beam emitted from the light source is vertical to the reflecting surface of the MEMS mirror 11 at a specific position. For example, the light source 10 is configured in such a manner that the light beam emitted from the light source 10 is vertical to the reflecting surface of the MEMS mirror 11 at the maximum drive angle. For example, the light source 10 is configured in such a manner that the light beam emitted from the light source 10 is vertical to the reflecting surface of the MEMS mirror 11 at the inner side of the maximum drive angle. For example, the light source 10 is located outside an area H where the optical scanner 1 carries out a main scanning (hereinafter referred to as 'scanned area').

The MEMS mirror 11 is configured in the outgoing direction of the light beam. The position of the MEMS mirror 11 indicated by the dashed lines shown in FIG. 1 represents the initial position of the MEMS mirror 11. The initial position is the position where the MEMS mirror 11 is configured when the optical scanner 1 starts an exposure operation. Thus, when an exposure operation is started, the light beam 101 emitted from the light source 10 is reflected by the MEMS mirror 11 at the initial position. The reflected light beam 102 irradiates the position where the optical scanner 1 starts a main scanning, thereby starting an exposure operation.

In the MEMS mirror 11, the position of the MEMS mirror 11 indicated by the solid lines shown in FIG. 1 is the maximum position of the MEMS mirror 11. The maximum position refers to the position where the MEMS mirror 11 is located after the optical scanner 1 completes an exposure operation. That is, the maximum position refers to the position of the MEMS mirror 11 located at the maximum working angle. In the embodiment, when the MEMS mirror 11 is at the maximum position, the optical axis of the light beam emitted from the light source 10 vertically irradiates the reflecting surface of the MEMS mirror 11. The position of the MEMS mirror 11 where the light beam of the light source 10 vertically irradiates the reflecting surface of the MEMS mirror 11 is hereinafter referred to as a vertical position. When an exposure operation is ended, the light beam 101 emitted from the light source 10 is reflected by the MEMS mirror 11 at the vertical position. The reflected light beam 103 reflected from the MEMS mirror 11 at the vertical position enters the light source 10, thereby ending the exposure operation of the optical scanner 1. Thus, the working range of the MEMS mirror 11 is from the initial position to the maximum position. That is, the working angle of the MEMS mirror 11 is an angle θ.

The MEMS mirror drive unit 14 drives the MEMS mirror 11 in the area H. The MEMS mirror drive unit 14 stops driving the MEMS mirror 11 according to a control signal sent from the drive control unit 15.

The drive control unit 15 controls the luminous energy (light amount) and the timing of the irradiation of the light source 10. The drive control unit 15 detects the position of the MEMS mirror by detecting the incidence of the light beam reflected by the MEMS mirror 11 onto the light source 10.

Figure 2:
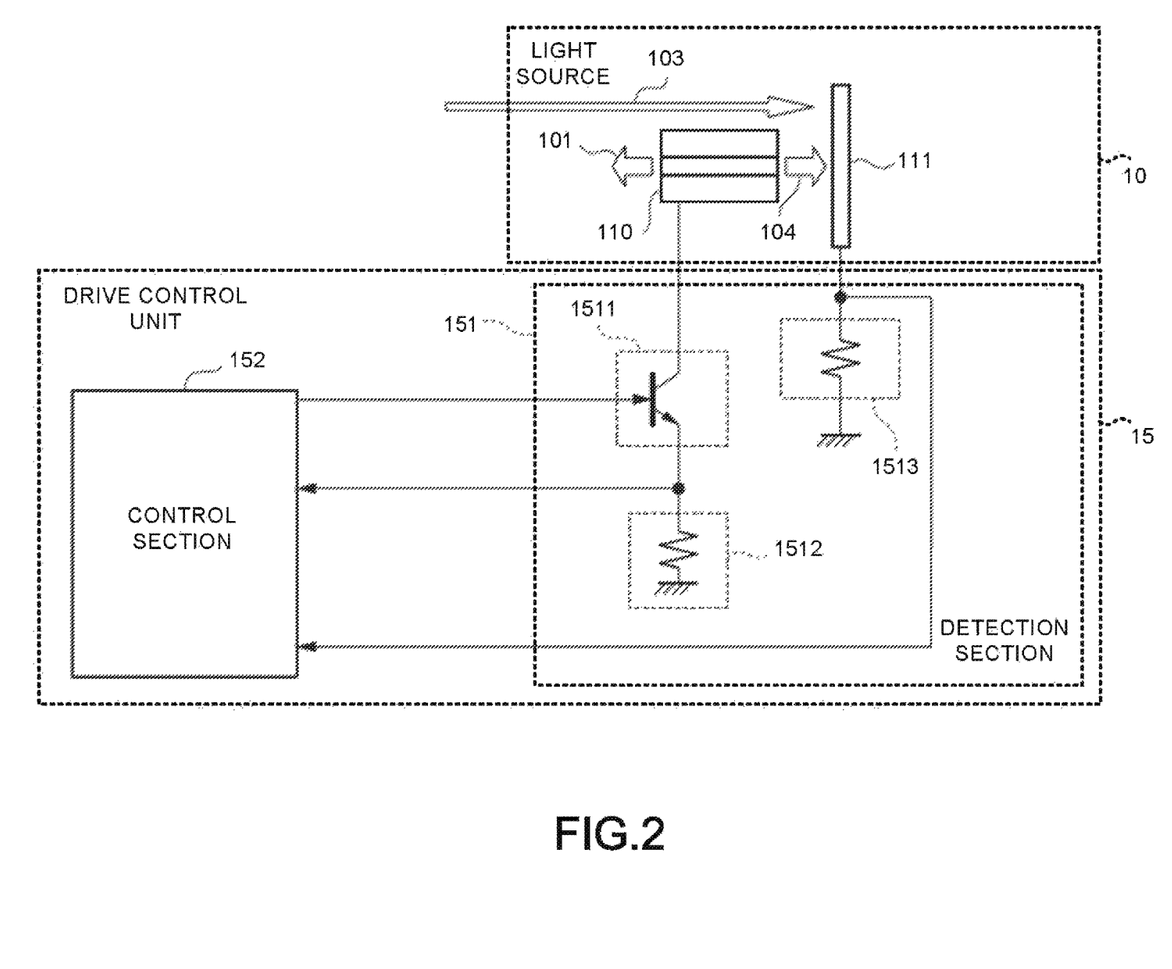
FIG. 2 is a diagram exemplifying the general structures of the light source 10 and the drive control unit 15 of an optical scanner 1 according to embodiment 1.

FIG. 2 is a diagram exemplifying the general structures of the light source 10 and the drive control unit 15 of the optical scanner 1 according to embodiment 1.

As shown in FIG. 2, the light source 10 comprises a light emitting unit 110 and a light receiving unit 111. For example, the light emitting unit 110 is a laser diode. For example, the light receiving unit 111 is a photo diode. The light emitting unit 110 emits a light beam 101 according to a drive current supplied by the drive control unit 15.

The light emitting unit 110 emits a light beam 104 in proportion to the light beam 101 towards the light receiving unit 111 while emitting the light beam 101. The light receiving unit 111 detects the light quantity of the light beam 104 emitted from the light emitting unit 110. The light receiving unit 111 detects the light beam 103 reflected by the MEMS mirror 11. That is, the light receiving unit 111 detects the light beam 103 when the optical axis of the light beam is vertical to the reflecting surface of the MEMS mirror 11.

The drive control unit 15 comprises a detection section 151 and a control section 152.

The detection section 151 comprises a drive portion 1511, a first conversion portion 1512 and a second conversion portion 1513. The drive portion 1511 applies a drive current to the light emitting unit 110 according to a drive signal sent from the control section 152. For example, the drive portion 1511 is a transistor. The first conversion portion 1512 converts the drive current applied to the light emitting unit 110 into a signal readable to the control section 152. The first conversion portion 1512 converts the drive current into a second output signal S2 and sends the second output signal S2 to the control section 152. For example, the first conversion portion 1512 is a resistor. For example, the second output signal S2 is a voltage corresponding to the drive current. That is, the first conversion portion 1512 converts the drive current into a voltage and outputs the voltage to the control section 152.

The second conversion portion 1513 converts the light quantity of the light beam received by the light receiving unit 111 into a signal readable to the control section 152. For example, the light receiving unit 111 performs photoelectric conversion on the light beam received, thereby supplying the light quantity of the light beam received to the second conversion portion 1513 as a current. In this way, the second conversion portion 1513 converts the current supplied from the light receiving unit 111 into a first output signal S1. The second conversion portion 1513 outputs the first output signal S1 to the control section 152. For example, the second conversion portion 1513 is a resistor. For example, the first output signal S1 is a voltage. That is, the second conversion portion 1513 converts the current supplied from the light receiving unit 111 into a voltage.

The control section 152 acquires the first output signal S1 and the second output signal S2. The control section 152 outputs a drive signal according to the first output signal S1 and the second output signal S2.

The control section 152 has an Automatic Power Control (APC) function. The control section 152 outputs a drive signal to the drive portion 1511 by setting the first output signal S1 to a preset value Sv. In this way, the control section 152 keeps the light quantity of the light beam 101 emitted from the light source 10 at a given value.

The control section 152 detects the position of the MEMS mirror 11 according to the first output signal S1 or the second output signal S2.

Figure 3:
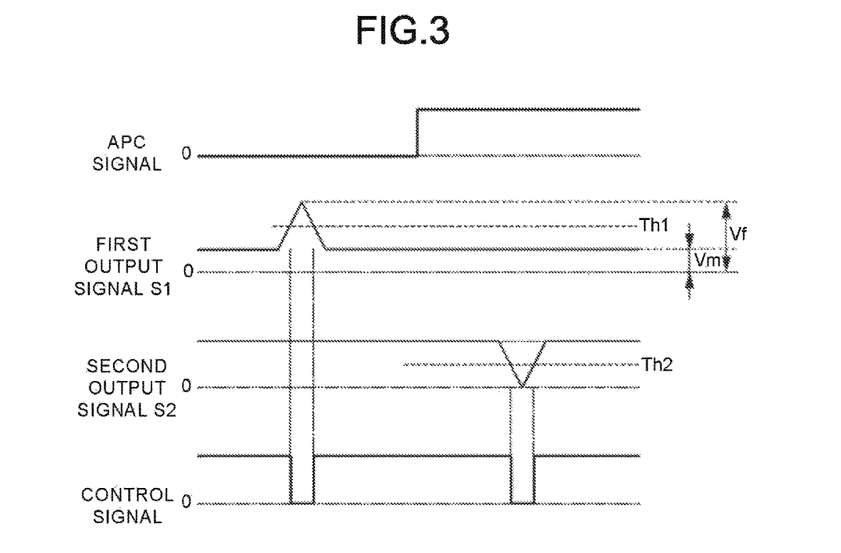
FIG. 3 is a timing chart illustrating the acquisition of output signals by a control section 152 according to embodiment 1.

The method for detecting the position of the MEMS mirror 11 in the case where the APC function is not executed is described below. FIG. 3 is a timing chart illustrating the acquisition of the first output signal S1 and the second output signal S2 by the control section 152 according to the embodiment. Further, an APC signal being ON represents the execution of the APC function. On the other hand, an APC signal being OFF represents no execution of the APC function. If the APC function is not executed, the control section 152 determines the position of the MEMS mirror 11 according to whether or not the first output signal S1 exceeds a threshold Th1.

In the case where the APC function is not executed, the first output signal S1 is not fed back to the control section 152. Thus, the light beam entering the light receiving unit 111 is output to the control section 152 as a voltage, as it is. The light beam 103 is not received by the light receiving unit 111 when the MEMS mirror 11 works in a range excluding the vertical position. Thus, the light receiving unit 111 only receives the light beam 104 and performs photoelectric conversion on the light beam 104 to convert the light quantity of the light beam received into a current and supplies the current to the second conversion portion 1513. The second conversion portion 1513 converts the current supplied from the light receiving unit 111 into a first output signal S1 of a voltage Vm (<Th1) and outputs the first output signal S1 to the control section 152. Thus, when the first output signal S1 of the voltage Vm smaller than a threshold Th1 is acquired, the control section 152 determines that the MEMS mirror 11 works in a range excluding the vertical position.

The light beam 103 and the light beam 104 are received by the light receiving unit 111 when the MEMS mirror 11 is at the vertical position. Thus, the light receiving unit 111 receives the light beam 103 and the light beam 104 and performs photoelectric conversion on the light beams received to convert the light quantity of the received light beams into a current and supplies the current to the second conversion portion 1513. The second conversion portion 1513 converts the current supplied from the light receiving unit 111 into a first output signal S1 of a voltage Vf(>Th1) and outputs the first output signal S1 to the control section 152. Thus, when the first output signal S1 of the voltage Vf greater than the threshold Th1 is acquired, the control section 152 determines that the MEMS mirror 11 is at the vertical position. In this way, in the case where the APC function is not executed, the control section 152 detects the position of the MEMS mirror 11 by detecting the change in the output of the light receiving unit 111.

The method for detecting the position of the MEMS mirror 11 in the case where the APC function is executed is described below.

In the case where the APC function is executed, the first output signal S1 is fed back to the control section 152.

The control section 152 acquires a drive current supplied from the first conversion portion 1512 as a second output signal S2. The control section 152 determines the position of the MEMS mirror 11 according to whether or not the second output signal S2 is below a preset threshold Th2. If the drive current indicated by the second output signal S2 is below the threshold Th2, the control section 152 determines that the MEMS mirror 11 is at the vertical position. On the other hand, if the drive current indicated by the second output signal S2 is above the threshold Th2, the control section 152 determines that the MEMS mirror 11 works in a range excluding the vertical position. For example, the light beam 103 is not received by the light receiving unit 111 when the MEMS mirror 11 works in a range excluding the vertical position. Thus, the light quantity of the light beam received by the light receiving unit 111 is merely the light quantity of the light beam 104, not increased or decreased in a short time. That is, the first output signal S1 is substantially equal to a set value Sv. Consequentially, the second output signal S2 supplied from the first conversion portion 1512 is above the threshold Th2, substantially unchanged.

The light beam 103 and the light beam 104 are received by the light receiving unit 111 when the MEMS mirror 11 is at the vertical position. Thus, the light receiving unit 111 receives the light beam 103 and the light beam 104 and performs photoelectric conversion on the received light beams to convert the light quantity of the received light beams into a current and supplies the current to the second conversion portion 1513. The second conversion portion 1513 converts the current supplied from the light receiving unit 111 into a first output signal S1 of a voltage Vf and outputs the first output signal S1 to the control section 152. The control section 152 acquires the first output signal S1 increased from the voltage Vm to the voltage Vf. The control section 152 controls the drive portion 1511 by setting the Vf to the set value Sv. That is, the control section 152 reduces the light quantity of the light beams received by the light receiving unit 111 by reducing the drive current. At this time, the control section 152 acquires the second output signal S2 sent from first conversion portion 1512. The second output signal S2 sent from the first conversion portion 1512 is below the threshold Th2. In this way, in the case where the APC function is executed, the control section 152 detects the position of the MEMS mirror 11 by detecting the change in the drive current of the light emitting unit 110.

The control section 152 controls the drive of the MEMS mirror drive unit 14 according to the first output signal S1 and the second output signal S2. The control section 152 controls the timing of the irradiation of the light beam of the light source 10 according to the first output signal S1 and the second output signal S2.

Figure 4:
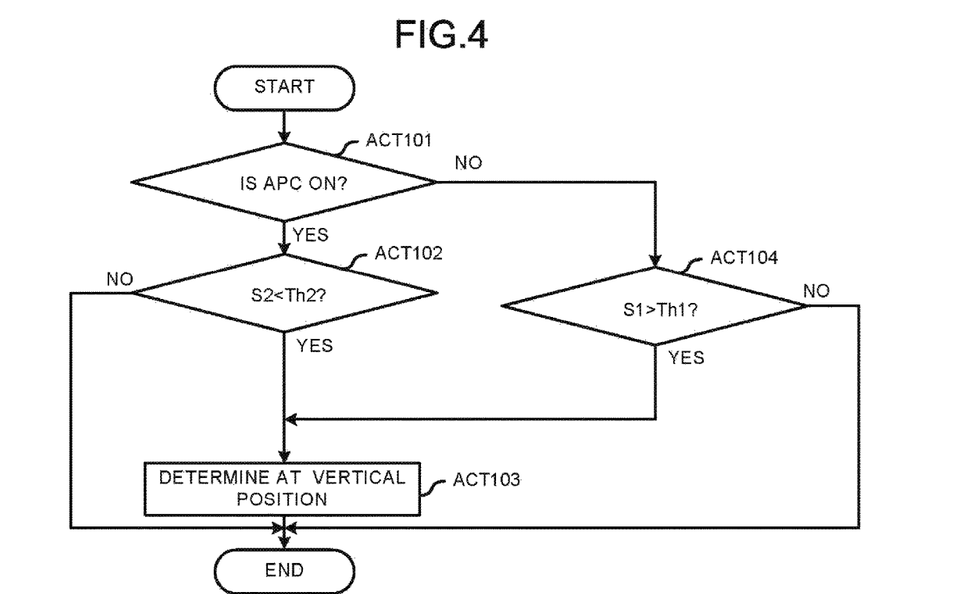
FIG. 4 is a diagram illustrating an action of detecting the position of an MEMS mirror 11 in an optical scanner 1 according to embodiment 1.

The detection on the position of the MEMS mirror 11 in the optical scanner 1 of the embodiment is described below with reference to accompanying drawings. FIG. 4 is a flowchart illustrating an action of detecting the position of the MEMS mirror 11 in the optical scanner 1 of the embodiment.

The MEMS mirror drive unit 14 drives the MEMS mirror 11 according to a drive signal sent from the drive control unit 15. The control section 152 determines whether or not to execute the APC function (Act 101). In the case where the APC function is executed, the control section 152 determines whether or not the second output signal S2 is below the threshold Th2 (Act 102). If the second output signal S2 is below the threshold Th2, the control section 152 determines that the MEMS mirror 11 is at the vertical position (Act 103). If the second output signal S2 is above the threshold Th2, the control section 152 determines that the MEMS mirror 11 is not at the vertical position. Moreover, the control section 152 ends the action of detecting the position of the MEMS mirror 11.

In the case where the APC function is not executed, the control section 152 determines whether or not the first output signal S1 is above the threshold Th1 (Act 104). If the first output signal S1 is above the threshold Th1, the control section 152 determines that the MEMS mirror 11 is at the vertical position (Act 103). If the first output signal S1 is below the threshold Th1, the control section 152 determines that the MEMS mirror 11 is not at the vertical position and ends the action of detecting the position of the MEMS mirror 11. The control section 152 carries out the actions shown in the flowchart of FIG. 4 every a certain period. Further, as shown in FIG. 3, the first output signal S1 or the second output signal S2 may be binarized. By binarizing the first output signal S1 or the second output signal S2, the first output signal S1 or the second output signal S2 is processed as a control signal.

Embodiment 2

Figure 5:
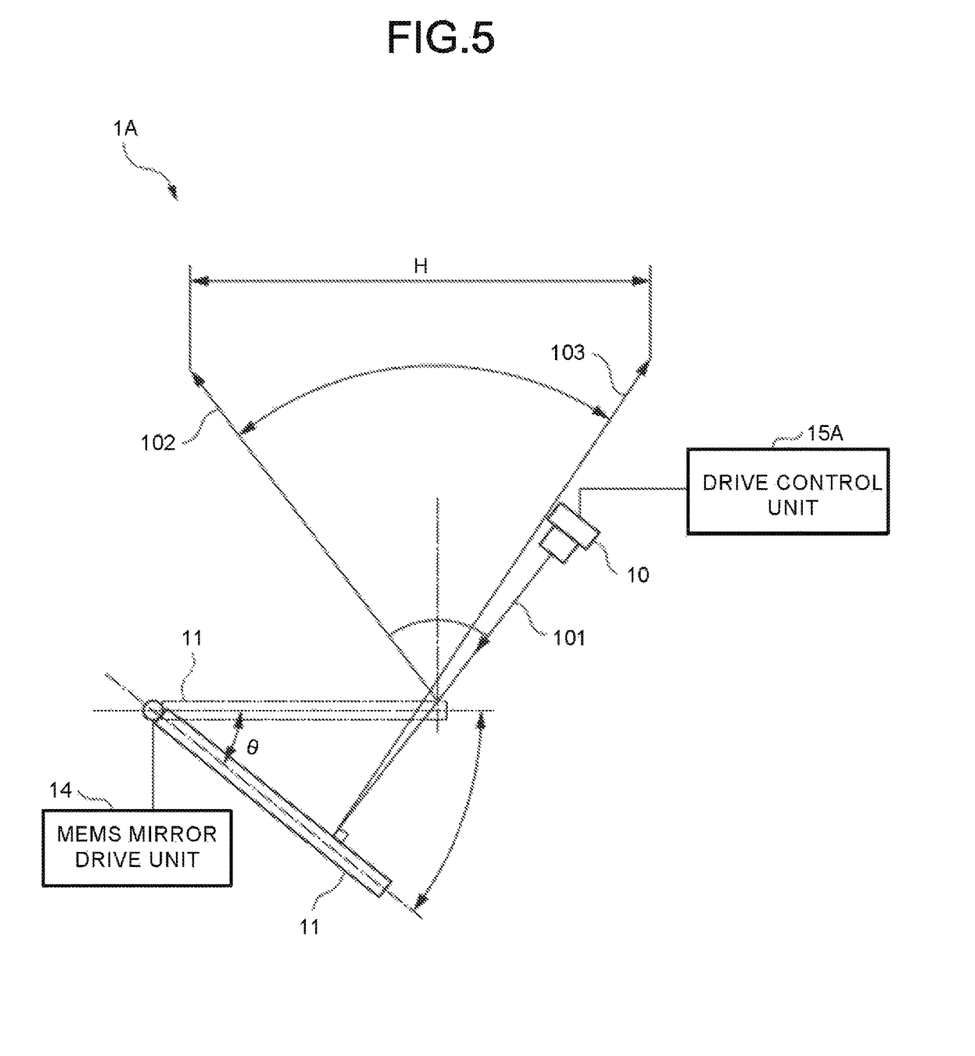
FIG. 5 is a diagram illustrating the appearance of an example of an optical scanner 1 according to embodiment 2.

FIG. 5 is a diagram illustrating the appearance of an example of an optical scanner 1A according to embodiment 2. For example, the optical scanner 1A is applied to an image forming apparatus. Moreover, the structural elements shown in FIG. 5 which are identical to those involved in embodiment 1 are denoted by the same reference signs and not described repeatedly here. The optical scanner 1A emits a light beam which is modulated according to an image signal read by the image forming apparatus. Moreover, the optical scanner 1A reflects the light beam with an MEMS mirror and irradiates (exposes) the surface of a photoconductive drum with the reflected light beam to form an electrostatic latent image on the surface of the photoconductive drum with the reflected light beam.

The optical scanner 1A comprises a light source 10, an MEMS mirror 11, an MEMS mirror drive unit 14 and a drive control unit 15A.

Figure 6:
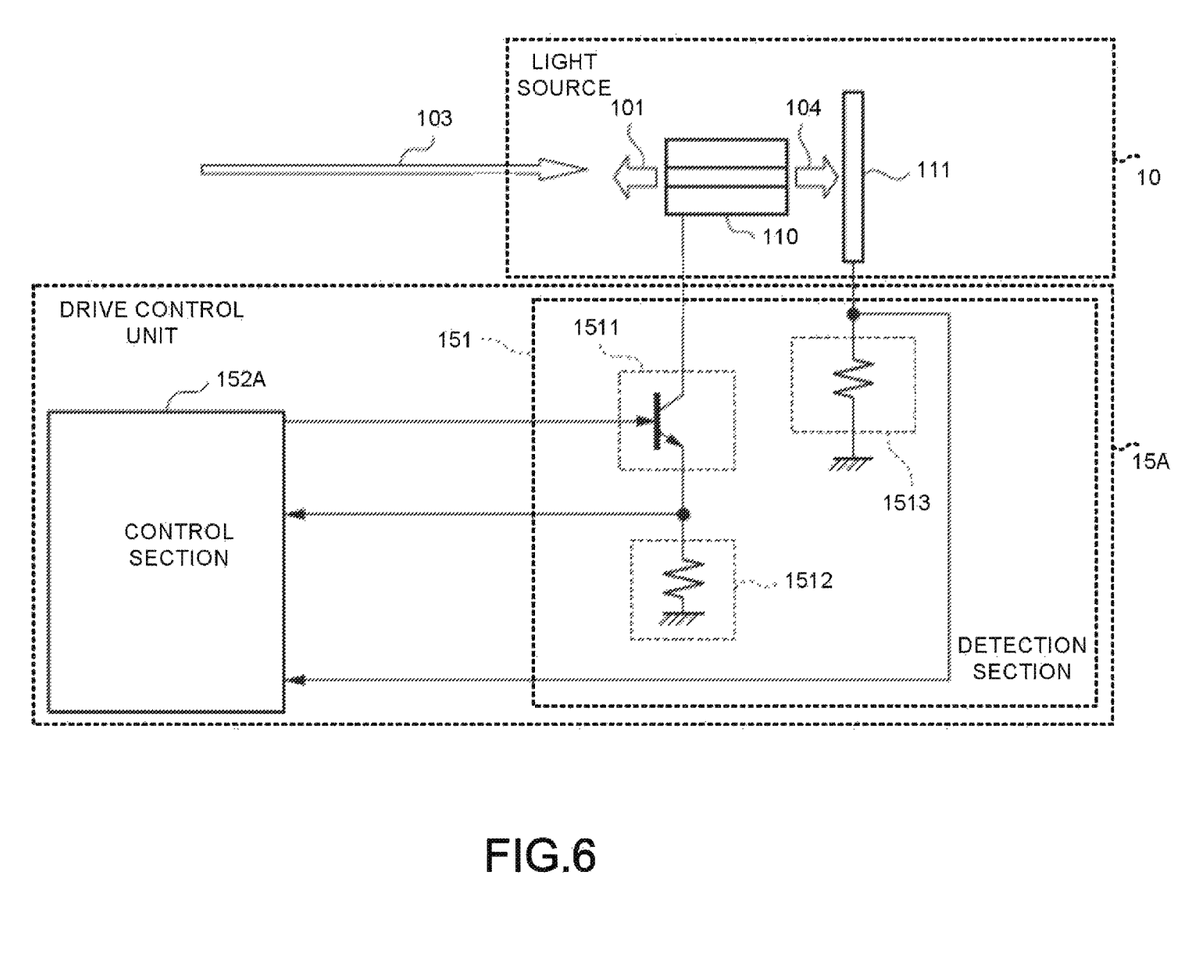
FIG. 6 is a diagram exemplifying the general structures of the light source 10 and the drive control unit 15 of an optical scanner 1 according to embodiment 2.

FIG. 6 is a diagram exemplifying the general structures of the light source 10 and the drive control unit 15A of the optical scanner 1A according to an embodiment.

The light emitting unit 110 emits a light beam 101 according to a drive current supplied from the drive control unit 15A. The light emitting unit 110 emits a light beam 104 in proportion to the light beam 101 towards the light receiving unit 111 while emitting the light beam 101. When the MEMS mirror 11 at the vertical position, the light beam 103 reflected by the reflecting surface of the MEMS mirror 11 enters the light emitting unit 110. Laser resonance is disturbed when the light beam 103 enters the light emitting unit 110. That is, the light quantity of the light beam 101 emitted from the light emitting unit 110 is reduced.

The light receiving unit 111 detects the light quantity of the light beam 104 emitted from the light emitting unit 110.

The drive control unit 15A comprises a detection section 151 and a control section 152A.

The control section 152A acquires the first output signal S1 and the second output signal S2. The control section 152A outputs a drive signal according to the first output signal S1 and the second output signal S2.

The control section 152A has an APC function. The control section 152A outputs the drive signal to the drive portion 1511 by setting the first output signal S1 to a preset value Sv. In this way, the control section 152A keeps the light quantity of the light beam 101 emitted from the light source 10 unchanged.

The control section 152A detects the position of the MEMS mirror 11 according to the first output signal S1 or the second output signal S2.

Figure 7:
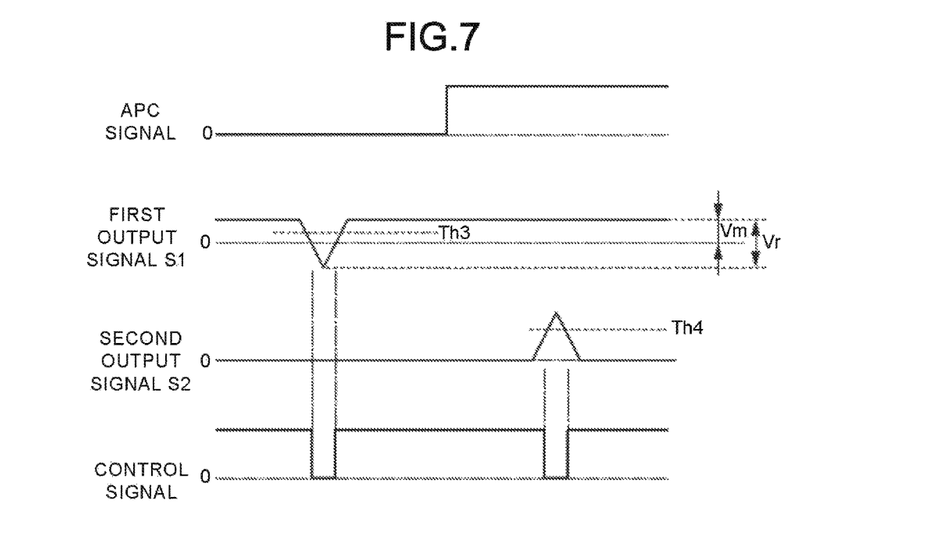
FIG. 7 is a timing chart illustrating the acquisition of output signals by a control section 152 according to embodiment 2.

The method for detecting the position of the MEMS mirror 11 in the case where the APC function is not executed is described below. FIG. 7 is a timing chart illustrating the acquisition of output signals by the control section 152A according to the embodiment. Further, an APC signal being ON represents the execution of the APC function. On the other hand, the APC signal being OFF represents no execution of the APC function. In the case where the APC function is not executed, the control section 152A determines the position of the MEMS mirror 11 according to the first output signal S1.

In the case where the APC function is not executed, the first output signal S1 is not fed back to the control section 152A. Thus, the light beam entering the light receiving unit 111 is output to the control section 152A as a voltage, as it is. Thus, when the MEMS mirror 11 works in a range excluding the vertical position, the light receiving unit 111 receives the light beam 104 and performs photoelectric conversion on the light beam 104 to convert the light quantity of the light beam received into a current and supplies the current to the second conversion portion 1513. The second conversion portion 1513 converts the current supplied from the light receiving unit 111 into a first output signal S1 of a voltage Vm(>Th3) and outputs the first output signal S1 to the control section 152A. Thus, when the first output signal S1 of the voltage Vm greater than a threshold value Th3 is acquired, the control section 152 determines that the MEMS mirror 11 works in a range excluding the vertical position.

As the light beam 103 enters the light emitting unit 110 when the MEMS mirror 11 is at the vertical position, the laser resonance of the light emitting unit 110 is disturbed. Consequentially, the laser resonance of the light emitting unit 110 is disturbed. A light beam 104' emitted from the light emitting unit 110 the laser resonance of which is disturbed is received by the light emitting unit 111. Thus, the light quantity of the light beam received by the light receiving unit 111 is reduced, compared with that of the light beam received by the light receiving unit 111 before the laser resonance of the light receiving unit 111 is disturbed.

The light receiving unit 111 receives the light beam 104' and performs photoelectric conversion on the received light beam to convert the light quantity of the light beam received into a current and supplies the current to the second conversion portion 1513. The second conversion portion 1513 converts the current supplied from the light receiving unit 111 into a first output signal S1 of a voltage Vr(<Th3) and outputs the first output signal S1 to the control section 152A. Thus, when the voltage Vr smaller than the threshold Th3 is acquired, the control section 152A determines that the MEMS mirror 11 is at the vertical position. In this way, in the case where the APC function is not executed, the control section 152A detects the position of the MEMS mirror 11 by detecting the change in the output of the light receiving unit 111.

The method for detecting the position of the MEMS mirror 11 in the case where the APC function is executed is described below.

In the case where the APC function is executed, the first output signal S1 is fed back to the control section 152A.

The control section 152A acquires a drive current supplied from the first conversion portion 1512 as a second output signal S2. The control section 152A determines the position of the MEMS mirror 11 according to whether or not the second output signal S2 is above a preset threshold Th4. If the drive current indicated by the second output signal S2 is above the threshold Th4, the control section 152A determines that the MEMS mirror 11 is at the vertical position. On the other hand, if the drive current indicated by the second output signal S2 is below the threshold Th4, the control section 152A determines that the MEMS mirror 11 works in a range excluding the vertical position. For example, the light beam 103 is not transmitted to the light emitting unit 110 when the MEMS mirror 11 works in a range excluding the vertical position. Thus, the laser resonance of the light emitting unit 110 is stable. Consequentially, the second output signal S2 supplied from the first conversion portion 1512 is below the threshold Th4, substantially unchanged.

The light beam 103 enters the light emitting unit 110 when the MEMS mirror 11 is at the vertical position. Thus, the laser resonance of the light emitting unit 110 is disturbed, consequentially, the light quantity of the light beam 101 emitted from the light emitting unit 110 is reduced, at the same time, the light quantity of the light beam 104 received by the light receiving unit 111 is reduced as well.

The light emitting unit 111 receives the light beam 104' emitted from the light emitting unit 110 the laser resonance of which is disturbed, performs photoelectric conversion on the received light beam 104' to convert the light quantity of the light beam received into a current and supplies the current to the second conversion portion 1513. The second conversion portion 1513 converts the current supplied from the light receiving unit 111 into a first output signal S1 of a voltage Vr(<Th3) and outputs the first output signal S1 to the control section 152A. The control section 152A controls the drive portion 1511 (APC) by setting the Vf to a set value Sv. That is, the control section 152A increases the light quantity of the light beam 103 emitted by the light emitting unit 110 by increasing the drive current. At this time, the control section 152A acquires the second output signal S2 sent from first conversion portion 1512. The second output signal S2 sent from the first conversion portion 1512 exceeds the threshold TH4. In this way, in the case where the APC function is executed, the control section 152 detects the position of the MEMS mirror 11 by detecting the change in the drive current of the light emitting unit 110.

The control section 152A controls the drive of the MEMS mirror drive unit 14 according to the first output signal S1 and the second output signal S2. The control section 152A controls the timing of the irradiation of light beam of the light source 10 according to the first output signal S1 and the second output signal S2.

Figure 8:
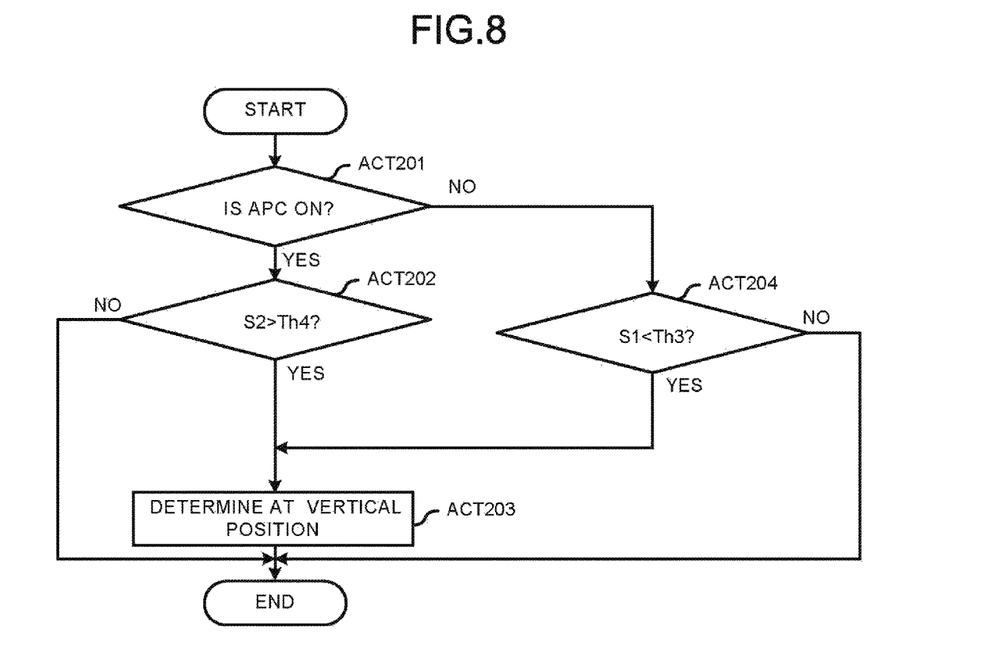
FIG. 8 is a diagram illustrating an action of detecting the position of an MEMS mirror 11 in an optical scanner 1 according to embodiment 2.

The detection on the position of the MEMS mirror 11 in the optical scanner 1A of the embodiment is described below with reference to accompanying drawings. FIG. 8 is a flowchart illustrating an action of detecting the position of the MEMS mirror 11 in the optical scanner 1A of the embodiment.

The MEMS mirror drive unit 14 drives the MEMS mirror 11 according to a drive signal sent from the drive control unit 15A. The control section 152A determines whether or not to execute the APC function (Act 201). In the case where the APC function is executed, the control section 152A determines whether or not the second output signal S2 is above the threshold Th4 (Act 202). If the second output signal S2 is above the threshold Th4, the control section 152A determines that the MEMS mirror 11 is at the vertical position (Act 203). If the second output signal S2 is below the threshold Th4, the control section 152A determines that the MEMS mirror 11 is not at the vertical position and ends the action of detecting the position of the MEMS mirror 11.

In the case where the APC function is not executed, the control section 152A determines whether or not the first output signal S1 is below the threshold Th3 (Act 204). If the first output signal S1 is below the threshold Th3, the control section 152A determines that the MEMS mirror 11 is at the vertical position (Act 203). If the first output signal S1 is above the threshold Th3, the control section 152A determines that the MEMS mirror 11 is not at the vertical position and ends the action of detecting the position of the MEMS mirror 11. The control section 152A carries out the actions shown in the flowchart of FIG. 8 every a certain period. Further, as shown in FIG. 7, the first output signal S1 or the second output signal S2 is binarized. By binarizing the first output signal S1 or the second output signal S2, the first output signal S1 or the second output signal S2 is processed as a control signal.

In accordance with at least one of the foregoing embodiments, an optical scanner comprises a light source 10 and an MEMS mirror 11. The light source 10 emits a light beam. The MEMS mirror 11 has a reflecting surface for reflecting the light beam coming from the light source 10.

The light source 10 is configured at a given position in the working range of the MEMS mirror 11 so that the optical axis of the light beam emitted from the light source 10 vertically irradiates the reflecting surface of the MEMS mirror 11, thus enabling the optical scanner to detect the position of the MEMS mirror. In this way, the high cost of an optical scanner is reduced, and the offset in the drive position of the MEMS mirror caused by the secular change of the MEMS mirror is avoided.

Further, the functions of the foregoing control section 152 or 152A are totally or partially used to record the programs (image forming programs) for realizing the functions in a computer-readable recording medium. Moreover, the functions may also be realized through the execution of the programs recorded in the recording medium by a CPU.

Further, the 'computer-readable recording medium' refers to a movable medium and a memory unit. For example, the movable medium is a floppy disk, a magneto-optical disk, an ROM or a CD-ROM. For example, the memory unit is a hard disc built in a computer system. Further, the 'computer-readable recording medium' refers to a network, a medium which dynamically stores a program for a short time or a medium which stores a program at a given moment. For example, the network is the Internet. For example, the medium for dynamically storing a program is a communication line which sends a program via a communication line. For example, the medium which stores a program at a given moment is a volatile memory constituting the inside of the computer system of a server or a client. Further, the foregoing programs may also be used to realize a part of the foregoing functions. Further, the foregoing functions may be realized by a combination of programs stored in a computer system.

While certain embodiments have been described, these embodiments have been presented by way of example only, and are not intended to limit the scope of the invention. Indeed, the novel embodiments described herein may be embodied in a variety of other forms; furthermore, various omissions, substitutions and changes in the form of the embodiments described herein may be made without departing from the spirit of the invention. The accompanying claims and their equivalents are intended to cover such forms or modifications as would fall within the scope and spirit of the invention.

What is claimed is:

1. An optical scanner, comprising:
a light source comprising a light emitting unit and a light receiving unit, the light emitting unit configured to emit and the light receiving unit configured to detect a light beam;
a MEMS mirror having a reflecting surface for reflecting the light beam when the light beam is emitted in a direction vertical to the reflecting surface and when the reflecting surface faces toward the light emitting unit;
a drive unit configured to control a drive current applied to the light emitting unit; and
a control section configured to:
have an auto power control function for controlling a drive unit to keep a light quantity of the light beam received by the light receiving unit to a specific value;
compare the drive current with a given threshold when the auto power control function is executed; and
determine, when the auto power control function is executed, whether the drive current is below the given threshold to allow for determining whether or not the MEMS mirror is positioned at a specific position.

2. The optical scanner of claim 1 further comprising,
the control section is configured to determine whether or not the MEMS mirror is positioned at a specific position by detecting that the light receiving unit has received the light beam reflected by the reflecting surface.

3. The optical scanner of claim 1 further comprising,
the control section is configured to determine whether or not a position of the MEMS mirror has changed by detecting a change in the light quantity of the light beam reflected by the MEMS mirror to the light emitting unit.

4. The optical scanner of claim 1, wherein
the light source is located outside a scanned area.

5. An optical scanner, comprising:
a light source comprising a light emitting unit and a light receiving unit, the light emitting unit configured to emit and the light receiving unit configured to detect a light beam;
a MEMS mirror having a reflecting surface for reflecting the light beam when the light beam is emitted in a direction vertical to the reflecting surface and when the reflecting surface faces toward the light emitting unit;
a drive unit configured to control a drive current applied to the light emitting unit; and
a control section configured to:
have an auto power control function for controlling a drive unit to keep a light quantity of the light beam received by the light receiving unit to a specific value;
compare the drive current with a given threshold when the auto power control function is executed; and
determine, when the auto power control function is executed, whether the drive current is above the given threshold to allow for determining whether or not the MEMS mirror is positioned at a specific position.

6. The optical scanner of claim 5, wherein
the specific position is where a working angle of the MEMS mirror is at a maximum of a range from an initial position to a maximum position.

* * * * *